US012625855B1

(12) United States Patent
 Dor et al.

(10) Patent No.: US 12,625,855 B1
(45) Date of Patent: May 12, 2026

(54) BULK INSERTION OF DATA INTO LOG-STRUCTURED MERGE TREE

(71) Applicant: Dell Products L.P., Round Rock, TX (US)

(72) Inventors: Ziv Dor, Nes Ziona (IL); Sabina Rachev, Herzliya (IL); Yosef Shatsky, Karnei Shomron (IL); Xiaomei Liu, Southborough, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/036,408

(22) Filed: Jan. 24, 2025

(51) Int. Cl.
 *G06F 16/22* (2019.01)
 *G06F 16/23* (2019.01)
 *G06F 16/2458* (2019.01)

(52) U.S. Cl.
 CPC ...... *G06F 16/2246* (2019.01); *G06F 16/2386* (2019.01); *G06F 16/2477* (2019.01)

(58) Field of Classification Search
 CPC ............. G06F 16/2246; G06F 16/2386; G06F 16/2477
 See application file for complete search history.

(56) References Cited

U.S. PATENT DOCUMENTS

| | | | |
|---|---|---|---|
| 10,839,016 B2 | 11/2020 | Wils | |
| 11,550,479 B1 | 1/2023 | Shatsky et al. | |
| 11,675,789 B2 | 6/2023 | Shatsky et al. | |
| 11,747,996 B2 * | 9/2023 | Senyuk ..................... | G06F 1/10 711/164 |
| 11,789,917 B2 | 10/2023 | Tal et al. | |
| 11,921,714 B2 | 3/2024 | Shatsky et al. | |
| 11,960,481 B2 | 4/2024 | Shatsky et al. | |
| 11,971,825 B2 | 4/2024 | Shatsky et al. | |
| 2020/0341889 A1 * | 10/2020 | Idreos ................. | G06F 16/1734 |
| 2022/0129433 A1 * | 4/2022 | Agrawal ............. | G06F 16/2264 |
| 2023/0229651 A1 * | 7/2023 | Dayan ................. | G06F 16/2358 707/797 |
| 2024/0028589 A1 * | 1/2024 | Shatsky ............... | G06F 16/244 |
| 2025/0156392 A1 * | 5/2025 | Garcia-Arellano ... | G06F 16/285 |

OTHER PUBLICATIONS

Wikipedia, "Log-structured Merge-tree," https://en.wikipedia.org/wiki/Log-structured_merge-tree, Nov. 21, 2023, 3 pages.

* cited by examiner

*Primary Examiner* — James E Richardson
(74) *Attorney, Agent, or Firm* — Ryan, Mason & Lewis, LLP

(57) ABSTRACT

Techniques are provided for managing LSM tree structures and enabling bulk insertion of data into LSM tree structures. An exemplary embodiment includes a method that is performed by a data management system. The data management system receives a plurality of data records generated at least in part by at least one background process, and generates a burst segment which comprises at least a portion of the plurality of data records. The data management system inserts the burst segment into a non-root level of a LSM tree structure.

20 Claims, 6 Drawing Sheets

100

<u>500</u>

<u>600</u>

BULK INSERTION OF DATA INTO LOG-STRUCTURED MERGE TREE

TECHNICAL FIELD

This disclosure relates generally to data management techniques and, more particularly, to techniques for utilizing log-structured merge tree structures for data management in, e.g., a storage system.

BACKGROUND

Log-structured merge (LSM) trees are data structures that are commonly used to manage data in various applications such as database and data storage systems. LSM trees are configured to handle frequent updates to data and to enable efficient data searching. An LSM tree generally includes a root level (referred to herein as Level 0 or L0) which is configured as the point of insertion of new segments of data records into the LSM tree. The segments of data records in the LSM tree are eventually "merged" into larger segments of data records in lower levels (i.e., non-root levels) of the LSM tree using, e.g., merge-sort algorithms. In circumstances where a significantly large amount of data records (e.g., burst of updates) needs to be bulk inserted into the LSM tree at once, in addition to the regular flow of data record insertion into L0, such bulk insertion of data records can result in resource contention of the L0 insertion resources, and deny resources from the regular flow of updates, thereby leading to degraded system performance.

SUMMARY

Exemplary embodiments of the disclosure include techniques for managing LSM tree structures and, in particular, to techniques to enable bulk insertion of data into LSM tree structures. For example, an exemplary embodiment includes a method that is performed by a data management system. The data management system receives a plurality of data records generated at least in part by at least one background process, and generates a burst segment which comprises at least a portion of the plurality of data records. The data management system inserts the burst segment into a non-root level of a LSM tree structure.

In other exemplary embodiments, the data management system assigns a timestamp to the burst segment which corresponds to a time of creation of the burst segment. The data management system inserts the burst segment into the non-root level of the LSM tree structure subsequent to an existing segment in the non-root level such that the existing segment has at least one of (i) a timestamp which is less than the timestamp of the burst segment, and (ii) a timestamp which is greater than the timestamp of the burst segment, but which comprises a set of merged segments that includes at least one segment with a timestamp that is less than the timestamp of the burst segment.

Other embodiments of the disclosure include, without limitation, systems and articles of manufacture comprising processor-readable storage media, which are configured for managing metadata of a storage system.

DETAILED DESCRIPTION

Figure 1:
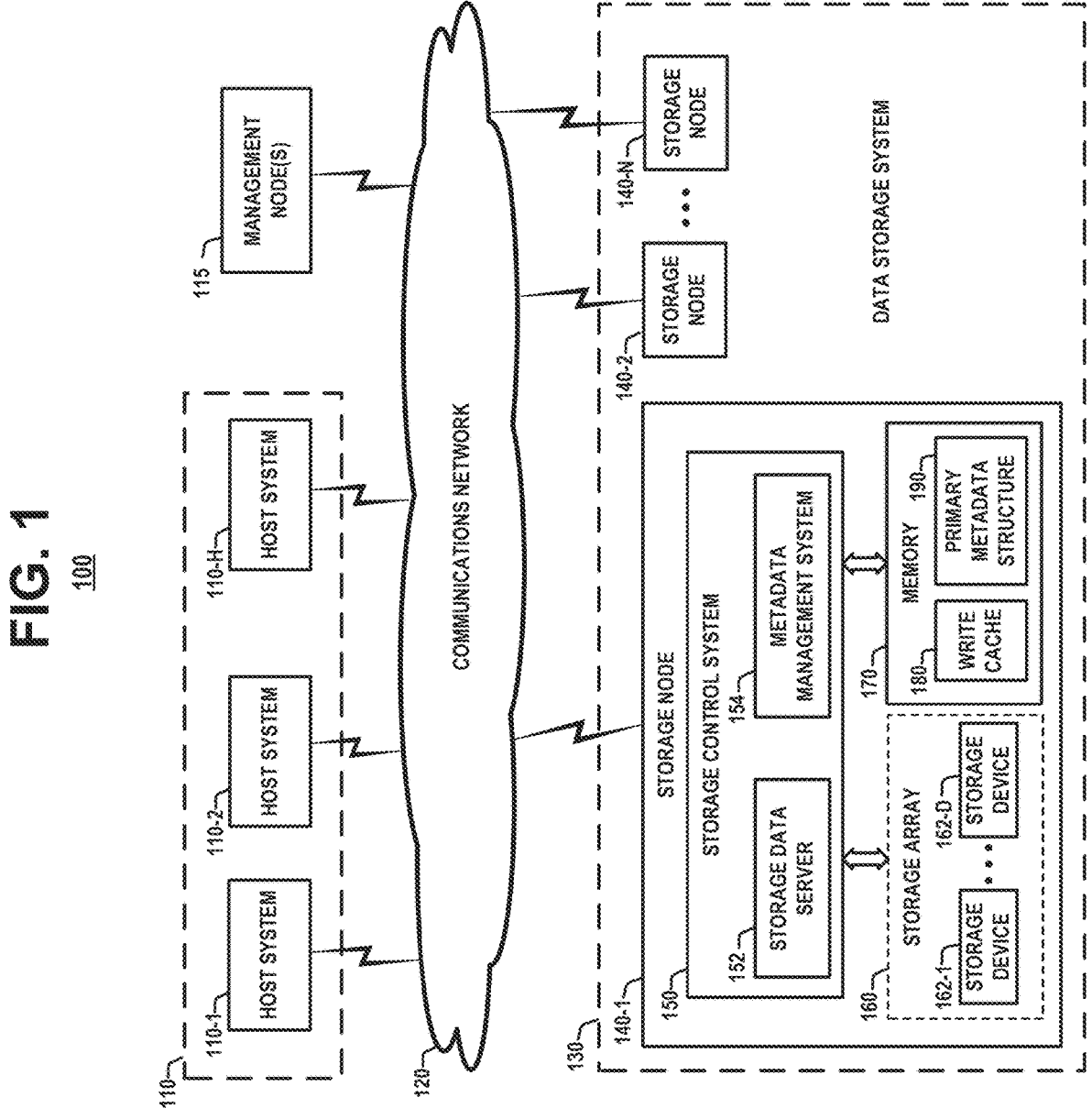
FIG. 1 schematically illustrates a network computing system comprising a data storage system which implements LSM tree structures for metadata management, according to an exemplary embodiment of the disclosure.

Exemplary embodiments of the disclosure will now be discussed in further detail with regard to techniques for managing LSM tree structures and, in particular, to systems and methods to enable bulk insertion of data into LSM tree structures. As noted above, an issue with the use of LSM tree structures arises in circumstances where a significantly large amount of data records (e.g., burst of data updates) needs to be bulk inserted into an LSM tree at once, in conjunction with the regular insertion flow of data records into the L0 level. Consequently, such bulk data insertion can result in resource contention of the L0 insertion resources, and deny resources from the regular flow of updates, thereby leading to degraded system performance.

For example, in the context of exemplary data storage systems as discussed herein where an LSM tree is utilized to manage storage metadata associated with user input/output (I/O) requests, the regular flow of updates to the LSM tree comprises user I/O metadata which is inserted into the L0 level of the LSM tree at a steady rate. In such systems, there can exist a background process (e.g., deduplication, data migration, data replication, etc.) which generates a large amount of data records (e.g., bulk storage metadata updates) that need to be inserted into the LSM tree at certain times, wherein the amount/size of the bulk data records will be orders of magnitude greater than the amount of memory size allocated for the L0 level of the LSM tree structure. Moreover, even when such bulk data records generated by the background process are on the same magnitude or less of the data provided by the IO stream over time, the insertion of a large burst of updates in the LSM tree structure would degrade the IO performance.

As explained in further detail below, techniques are provided to enable the bulk insertion of data records into the LSM tree structure while avoiding contention on the L0 insertion resources by, e.g., inserting a burst of data records created from a background worker process as full segments into lower levels of the LSM tree structure. This allows LSM burst segments to be prepared in the background, which includes sorting the data records (e.g., by key index) and persisting the data records in memory. Once a "burst" segment is ready, it is atomically introduced into the LSM tree structure by operation of an LSM control structure. The insertion of burst segments into lower levels of the LSM tree structure avoids all pressure on the L0 level (regular insertion level of the LSM tree structure) as the new records will not require L0 resources. Moreover, to maintain proper relations between records which have, e.g., a same index key, each segment in the LSM tree structure is augmented with a timestamp, which provides an attribute of time to explicitly quantify a "freshness" of data records within the segment, and which allows for comparing timestamps of segments in the LSM tree structure to determine freshness of data records within the segments, which is in contrast to conventional LSM tree structures in which "freshness" is implied by the ordering of segments in the LSM tree structure.

For purposes of illustration, exemplary embodiments will be described herein with reference to exemplary network computing environments, such as distributed storage environments, which implement data processing systems and associated computers, servers, storage devices and other processing devices. It is to be appreciated, however, that these and other embodiments are not restricted to the particular illustrative system and device configurations shown. Accordingly, the term "network computing environment" as used herein is intended to be broadly construed, so as to encompass, for example, processing systems comprising cloud computing and storage systems, as well as other types of processing systems comprising various combinations of physical and virtual processing resources. A network computing environment may therefore comprise, for example, at least one data center or other cloud-based systems that include one or more cloud systems that host multiple tenants which share cloud resources. Numerous different types of enterprise computing and storage systems are also encompassed by the term "network computing environment" as that term is broadly used herein.

FIG. 1 schematically illustrates a network computing system comprising a data storage system which implements LSM tree structures for metadata management, according to an exemplary embodiment of the disclosure. The network computing system 100 comprises one or more host systems 110-1, 110-2, ... 110-H (collectively, host systems 110), one or more management nodes 115, a communications network 120, and a data storage system 130. The data storage system 130 comprises one or more storage nodes 140-1, 140-2, ... , 140-N (collectively, storage nodes 140). As shown in FIG. 1, the storage node 140-1 comprises a storage control system 150, a storage array 160 (e.g., primary storage) comprising a plurality of storage devices 162-1, ... , 162-D (collectively, storage devices 162), and primary memory 170 (alternatively, system memory 170). The primary memory 170 comprises volatile random-access memory (RAM) and non-volatile RAM (NVRAM). The storage control system 150 comprises a storage data server 152, and a metadata management system 154. In some embodiments, the primary memory 170 is configured to implement a write cache 180 and a primary metadata structure 190 (e.g., storage metadata structure). The metadata management system 154 implements methods that are configured to provision and manage the primary metadata structure 190. In some embodiments, as explained in further detail below, the metadata management system 154 is configured to utilize the write cache 180 and the primary metadata structure 190 to manage metadata on the storage node 140. In some embodiments, the other storage nodes 140-2 . . . 140-N have the same or similar configuration as the storage node 140-1 shown in FIG. 1.

In general, the management nodes 115 implement application programming interfaces (APIs) to enable manual, automated, and/or semi-automated configuration, management, provisioning, and monitoring of the data storage system 130 and the associated storage nodes 140. In some embodiments, the management nodes 115 comprise stand-alone dedicated management server nodes, which may comprise physical and/or virtual server nodes.

The host systems 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. The host systems 110 can include virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in the storage arrays 160 of the storage nodes 140 and (ii) read requests to access data that is stored in the storage arrays 160 of the storage nodes 140.

The communications network 120 is configured to enable communication between the host systems 110 and the storage nodes 140, and between the management nodes 115, the host systems 110, and the storage nodes 140, as well as to enable peer-to-peer communication between the storage nodes 140 of the data storage system 130. In this regard, while the communications network 120 is generically depicted in FIG. 1, it is to be understood that the communications network 120 may comprise any known communications network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

The data storage system 130 may comprise any type of data storage system, or combination of data storage systems, including, but not limited to, a storage area network (SAN) system, a network-attached storage (NAS) system, a direct-attached storage (DAS) system, dynamic scale-out data storage systems, or other types of distributed data storage systems comprising software-defined storage, clustered or distributed virtual and/or physical infrastructure. The term "data storage system" as used herein should be broadly construed and not viewed as being limited to storage systems of any particular type or types. It is to be noted that each storage node 140 and its associated storage array 160 is an example of what is more generally referred to herein as a "storage system" or a "storage array." The storage nodes 140 can be physical nodes, virtual nodes, and a combination of physical and virtual nodes.

In some embodiments, the storage nodes 140 comprise storage server nodes (e.g., server node 700, shown in FIG. 7) having processor and system memory, and possibly implementing virtual machines and/or containers, although numerous other configurations are possible. In some embodiments, one or more of the storage nodes 140 can additionally implement functionality of a compute node, and vice-versa, wherein a compute node is configured to process data and execute tasks/workloads and perform computational work, either individually, or in a distributed manner, to thereby provide compute services such as execution of one or more applications on behalf of one or more users. In this regard, the term "storage node" as used herein is therefore intended to be broadly construed, and a storage system in some embodiments can be implemented using a combination of storage nodes and compute nodes. In some embodiments, each storage node 140 comprises a server node that is implemented on, e.g., a physical server machine or storage appliance comprising hardware processors, system memory, and other hardware resources that execute software and firmware to implement the functionalities and data management services of the storage node 140 and the storage control system 150, as discussed herein. More specifically, in some embodiments, each storage node 140 comprises a plurality of storage control processors which execute a lightweight operating system (e.g., a customized lightweight Linux kernel) and functional software (e.g., software-defined storage software) to implement various functions of the storage node 140 and the storage control system 150, wherein such functions include, but are not limited to, (i) managing and executing data access requests issued by the host systems 110, (ii) performing various data management and storage services, and (iii) controlling network communication and connectivity with the host systems 110 and between the storage nodes 140 within the data storage system 130, etc.

In a distributed storage environment, the storage control systems 150 of the storage nodes 140 are configured to communicate in a cooperative manner to perform functions such as e.g., processing data access requests received from the host systems 110, aggregating/pooling the storage capacity of the storage arrays 160 of the storage nodes 140, performing functions such as inline data compression/decompression, data deduplication, thin provisioning, and data protection functions such as data replication, snapshot, and data protection and resiliency schemes based on data striping and/or parity (e.g., erasure coding, RAID, etc.), and other types of data management functions, depending on the system configuration.

The storage devices 162 comprise one or more of various types of storage devices such as hard-disk drives (HDDs), solid-state drives (SSDs), Flash memory cards, or other types of non-volatile memory (NVM) devices including, but not limited to, non-volatile random-access memory (NVRAM), phase-change RAM (PC-RAM), magnetic RAM (MRAM), etc. In some embodiments, the storage devices 162 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices may be implemented in the data storage system 130. In this regard, the term "storage device" as used herein should be broadly construed to encompass all types of persistent storage media including hybrid drives.

In some embodiments, the storage array 160 of a given storage node 140 comprises DAS resources (internal and/or external), wherein the storage control system 150 of the given storage node 140 is configured to directly access the storage array 160 of the given storage node 140. In some embodiments, the data storage system 130 comprises a disaggregated data storage system in which storage data processing is separate from data storage. More specifically, in an exemplary embodiment of a disaggregated storage system, the storage control systems 150 comprise storage control nodes, and the storage arrays 160 comprise storage nodes, which are separate from the storage control nodes. In such a configuration, the storage control nodes (e.g., storage control systems 150) are configured to handle the processing of data associated with data access requests (i.e., input/output (I/O) read and write requests), and the storage nodes (storage array 160) are configured to handle writing/reading data to/from respective storage devices 162. In a disaggregated architecture, each storage control node (e.g., each storage control system 150) would be configured to directly access data stored in each storage node (e.g., each storage array 160) in the data storage system 130. The disaggregated storage system architecture essentially separates the storage control compute layers (e.g., storage control systems 150) from the data storage layers (e.g., storage arrays 160).

In a disaggregated data storage system, each storage array 160 is implemented as, e.g., an external DAS device, wherein each storage control system 150 of each storage node 140-1, 140-2, . . . , 140-N is connected to each storage array 160 using any suitable interface protocol such as Small Computer Systems Interface (SCSI), Fibre Channel (FC), etc. In other embodiments, the storage control systems 150 of the storage nodes 140-1, 140-2, . . . , 140-N can be network-connected to each of the storage arrays 160 (via a high-performance network fabric) using any suitable network configuration and network interface protocol such as Ethernet, FC, Internet Small Computer Systems Interface (ISCSI), InfiniBand, etc. For example, in some embodiments, the storage nodes 140 and the storage arrays 160 are interconnected in a full-mesh network, wherein back-end interconnectivity between the storage nodes 140 and the storage arrays 160 is achieved using, e.g., a redundant high-speed storage fabric, wherein the storage control systems 150 can utilize remote procedure calls (RPC) for control messages and remote direct memory access (RDMA) for moving data blocks.

In some embodiments, the storage data servers 152 of the storage nodes 140 are configured to consolidate the capacity of the storage arrays 160 (e.g., HDDs, SSDs, PCIe or NVMe flash cards, etc.) of the storage nodes 140 into storage pools from which logical volumes are allocated, wherein the logical volumes (e.g., a block unit of storage management) are identified by, e.g., logical unit numbers (LUNs). More specifically, the storage data servers 152 of the storage nodes 140 are configured to create and manage storage pools (e.g., virtual pools of block storage) by aggregating storage capacity of the storage arrays 160 of the storage nodes 140 and dividing a given storage pool into one or more volumes, wherein the volumes are exposed to the host systems 110 as block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In some embodiments, each host system 110 comprises a storage data client (SDC) which executes on the host system and which consumes the block storage exposed by the storage data servers 152. In particular, an SDC comprises a lightweight block device driver that is deployed on a given host system 110 to expose shared block volumes to the given host system 110. The SDC exposes the storage volumes as block devices to each application (e.g., virtual machine, container, etc.) that execute on the same server (e.g., host system 110) on which the SDC is installed. The SDC of a given host system 110 exposes block devices representing the virtual storage volumes that are currently mapped to the given host system 110. The SDC for a given host system 110 serves as a block driver for the host system 110, wherein the SDC intercepts I/O requests, and utilizes the intercepted I/O request to access the block storage that is managed by the storage data servers 152. The SDC provides the operating system or hypervisor (which runs the SDC) access to the logical block devices (e.g., volumes). Each SDC has knowledge of which storage data servers 152 hold (e.g., own) their block data, so multipathing can be accomplished natively through the SDCs.

As noted above, the management nodes 115 in FIG. 1 implement a management layer which manages and configures the network computing system 100. In some embodiments, the management nodes 115 comprise a tightly-coupled cluster of manager nodes that are configured to supervise the operations of the storage cluster and manage storage cluster configurations. For example, management nodes 115 include metadata manager (MDM) modules that operate outside of the data path and provide the relevant information to the SDCs and the storage data servers 152 to allow such components to control data path operations. The MDM modules are configured to manage the mapping of SDCs to the storage data servers 152 of the storage nodes 140. The MDM modules manage various types of metadata that are required to perform various management operations in the storage environment such as, e.g., managing configuration changes, managing the SDCs and storage data servers 152, maintaining and updating device mappings, maintaining management metadata for controlling data protection operations such as snapshots, replication, RAID configurations, etc., managing system capacity including device allocations and/or release of capacity, performing operations for recovery from errors and failures, and performing system rebuild tasks including rebalancing, etc.

The metadata management system 154 is configured to utilize the write cache 180 and the primary metadata structure 190 to manage metadata of the storage system. The write cache 180 and the primary metadata structure 190 are maintained in a persistent storage/memory resource. In the context of a software-defined storage system, the storage control system 150 is essentially a hardware independent storage control system which is configured to abstract storage and memory resources from the underlying hardware platform for greater flexibility, efficiency and faster scalability. In this regard, the storage control system 150 will have no control over the types of storage and memory hardware resources that will be utilized during run-time. In this regard, in some embodiments, the write cache 180 and the primary metadata structure 190 are implemented in primary memory 170. In other embodiments, the write cache 180 and/or the primary metadata structure 190 can be implemented in primary storage (e.g., the storage array 160).

As noted above, the primary memory 170 comprises volatile RAM such as dynamic RAM (DRAM), synchronous DRAM (SDRAM), etc. In some embodiments, the primary memory 170 comprises non-volatile memory which is configured as RAM. For example, in some embodiments, the primary memory 170 comprises a storage class memory (SCM) tier which extends the RAM that is available to the operating system of the storage node 140. The SCM tier can be implemented with various types of non-volatile memory media hardware such as persistent memory (PMEM) modules, solid-state drive (SSD) devices, nonvolatile dual in-line memory modules (NVDIMMs), and other types of persistent memory modules with a DRAM form factor, etc. In addition, the persistent memory may be implemented using a vaulting RAM system which comprises a battery-backed RAM in which data is stored to vault devices upon device or power failure. In general, the non-volatile memory devices can be accessed over a memory bus (implemented via, e.g., Peripheral Component Interconnect Express) using a suitable interface such as non-volatile memory express (NVMe).

The metadata management system 154 is configured to implement a high-performance metadata storage and processing system through use of the primary metadata structure 190 which, as explained in further detail below, implements an LSM tree structure to store updates of storage metadata. For example, the metadata is maintained and managed in such a manner that the metadata is at least as resilient as the associated data. In addition, the metadata is maintained and managed in a manner that the metadata is swappable between RAM and persistent storage. Due to the size of the metadata, the metadata may not fit within RAM in many cases. As such, the metadata management system 154 allows relevant metadata to be maintained in RAM, and then allows swapping in of metadata when the workload changes. Further, the metadata is generated and managed in a way that minimizes write overhead. For example, the persisting of the metadata does not add a significant amount of bandwidth or IOPS. In addition, the metadata management system 154 supports both random and sequential access to the metadata.

Figure 2:
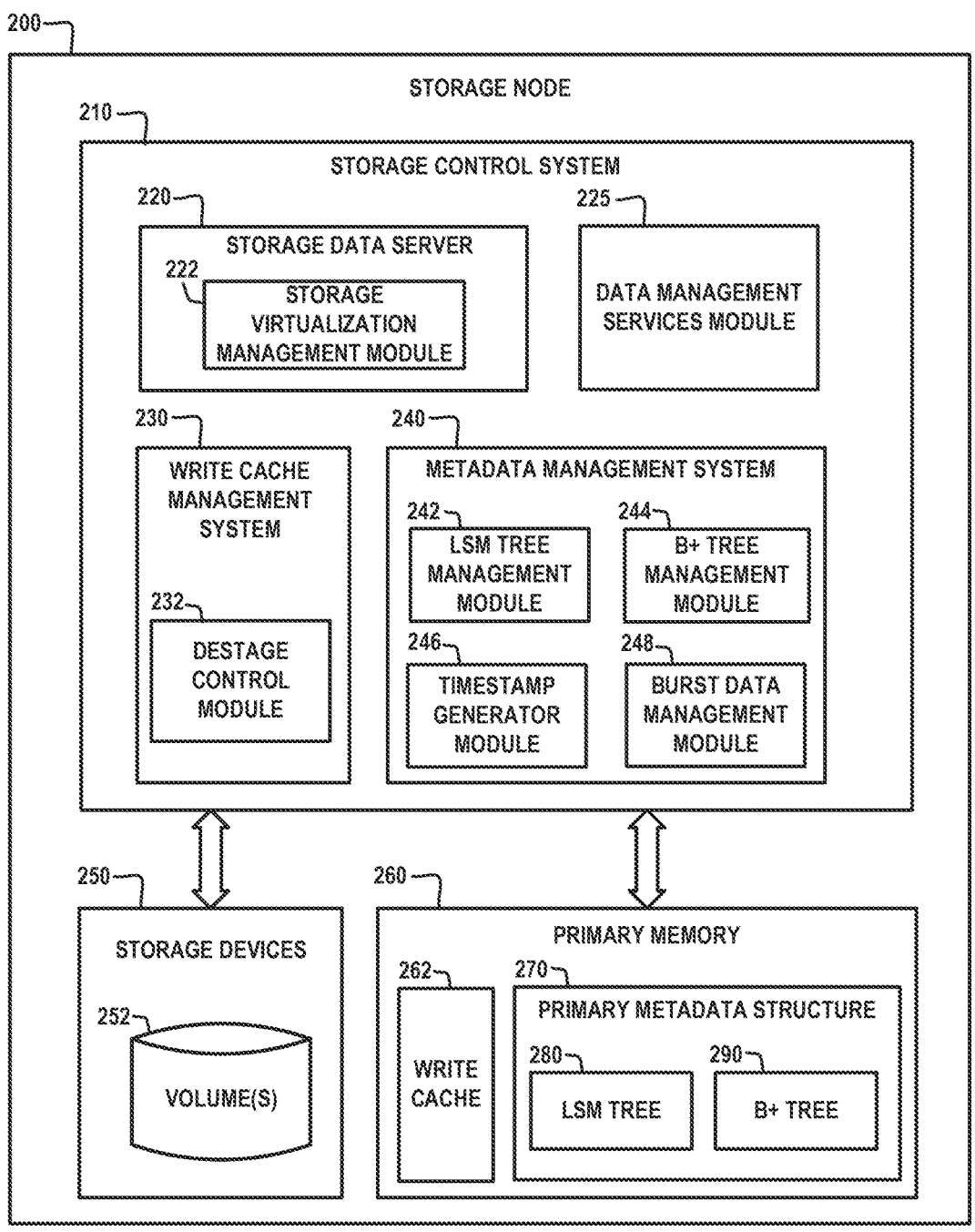
FIG. 2 schematically illustrates a storage node which implements an LSM tree structure for metadata management, according to an exemplary embodiment of the disclosure.

FIG. 2 schematically illustrates a storage node which implements an LSM tree structure for metadata management, according to an exemplary embodiment of the disclosure. In some embodiments, FIG. 2 schematically illustrates an exemplary architecture of the storage nodes 140 of the data storage system 130 of FIG. 1. As shown in FIG. 2, the storage node 200 comprises a storage control system 210 which implements a storage data server 220, a data management services module 225, a write cache management system 230, and a metadata management system 240. The storage data server 220 comprises a storage virtualization management module 222. The write cache management system 230 comprises various functional modules including, but not limited to, a write cache destage control module 232. The metadata management system 240 comprises various functional modules including, but not limited to, an LSM tree management module 242, a B+ tree management module 244, a timestamp generator module 246, and a burst data management module 248.

The storage node 200 further comprises an array of storage devices 250 and primary memory 260. The storage devices 250 comprise primary storage resources, wherein at least some capacity of the storage devices 250 is partitioned into one or more storage volumes 252. In the exemplary embodiment of FIG. 2, the primary memory 260 comprises a write cache 262 which is provisioned and managed by the write cache management system 230. In some embodiments, the write cache 262 resides in a region of non-volatile RAM (e.g., PMEM memory, SSD memory, etc.), which is allocated for the write cache 262. In other embodiments, the write cache 262 resides in an allocated region of the storage space of the array of storage devices 250.

As further shown in FIG. 2, the primary memory 260 comprises a primary metadata structure 270 (e.g., storage metadata structure). In some embodiments, the primary metadata structure 270 comprises an LSM tree structure 280 (alternatively referred to as updates data structure), and a B+ tree structure 290 (alternatively referenced to as core data structure). The LSM tree structure 280 is provisioned and managed by the LSM tree management module 242, and the B+ tree structure 290 is provisioned and managed by the B+ tree management module 244. The timestamp generator module 246 is configured to generate a timestamp for each segment (e.g., regular segments and burst segments) that is to be inserted into the LSM tree structure 280 by operation of the LSM tree management module 242. In some embodiments, the timestamps are generated with monotonically increasing values so that no two segments in the LSM tree structure 280 will have the same timestamp. The burst data management module 248 is configured to receive data records that are generated by a given background process, and generate immutable burst segments that are inserted into the LSM tree structure 280 by operation of the LSM tree management module 242. As explained in further detail below, in some embodiments, for data storage applications, the LSM tree management module 242 is configured to generate regular LSM segments with metadata records corresponding to user I/O operations which are inserted into the root L0 level of the LSM tree structure 280, and insert burst segments (which are generated by the burst data management module 248) into lower levels (i.e., non-root levels) in the LSM tree structure 280.

The storage data server 220 implements functions as discussed above such as processing I/O write and read requests received from host systems to write/read data to/from the storage devices 250. The storage virtualization management module 222 implements any suitable logical volume management (LVM) system which is configured to create and manage the storage volumes 252 by aggregating the capacity of the storage devices 250 into one or more virtual storage pools that are thin-provisioned for maximum capacity, and logically dividing each storage pool into one or more storage volumes that are exposed as block devices (e.g., LUNs) to the applications or host systems 110 (FIG. 1) which consume the data. The data management services module 225 implements one or more types of data management services including, but not limited to, inline data compression/decompression, thin provisioning, data deduplication, and data protection functions such as data replication, data backup, data snapshot, and data protection and resiliency schemes based on data striping and/or parity (e.g., erasure coding, RAID, etc.), and other types of data management functions, depending on the system configuration. In embodiments where the storage data server 220 abstracts the physical media (e.g., storage devices 250) and presents logical (virtualized) addresses to users in the form of LUNs, the storage data server 220 generates metadata to provide mapping between logical addresses and physical addresses. In addition, the storage control system 210 generates metadata which is utilized for managing snapshots, tracking for remote replication, managing deduplication pointers, managing data compression, resiliency related metadata (e.g., RAID), etc. The metadata management system 240 manages the metadata generated by the storage control system 210.

The write cache management system 230 implements methods that are configured to provision and manage the write cache 262 in the primary memory 260 or in primary storage as provided by the array of storage devices 250. In some embodiments, the write cache 262 is utilized to serve I/O write requests by persistently storing data items (e.g., write data) together with associated metadata items in the write cache 262. In this regard, the write cache 262 reduces the overhead for handling write data and associated metadata since the write data and associated metadata is initially stored and persisted in the write cache 262 without the need for extra I/O to store the metadata items separately from the data items. In addition, when the storage control system 210 receives an I/O write request and associated write data from a given host system, the storage control system 210 will send an acknowledgment to the host system to indicate that the write data is successfully written to the primary storage, in response to the received write data and associated metadata being stored in the write cache 262.

In some embodiments, the write cache 262 is implemented as a cyclic buffer, wherein items (e.g., data items and metadata items) are always written to a head location of the write cache 262, and items are destaged from a tail location of the write cache 262. With this scheme, the items in the write cache 262 are arranged in a cyclic write order from the tail location of the write cache 262 to the head location of the write cache 262. Further, in some embodiments, the write cache management system 230 utilizes a plurality of pointers in conjunction with the write cache 262 (e.g., cyclic write cache) to (i) determine the tail location and the head location of the write cache 262, (ii) determine a location in the write cache 262 from where to begin a recovery process, and to (iii) keep track of the data items and metadata items that are destaged from the tail of the write cache 262 via destage operations performed by the write cache destage control module 232.

More specifically, the write cache destage control module 232 implements write cache eviction/destaging operations which take into consideration that the write cache 262 comprises both data items and associated metadata items, which are separate entities that are persisted in different primary data structures. In some embodiments, the write cache destaging operations are configured to destage data items and destage metadata items, separately, based on associated eviction/destaging policies. For example, the metadata items destaged from the write cache 262 are persisted in the primary metadata structure 270 using techniques as discussed in further detail below. The metadata management system 240 utilizes the write cache 262 in conjunction with the primary metadata structure 270 to persist, manage, and access metadata maintained by the storage node 200. Collectively, the write cache 262 and the primary metadata structure 270 provide a high-performance data structure that enables efficient management of metadata in the storage system. Various techniques for high-performance metadata management using, e.g., LSM tree structures, will now be discussed in further detail in conjunction with FIGS. 3-6.

Figure 3:
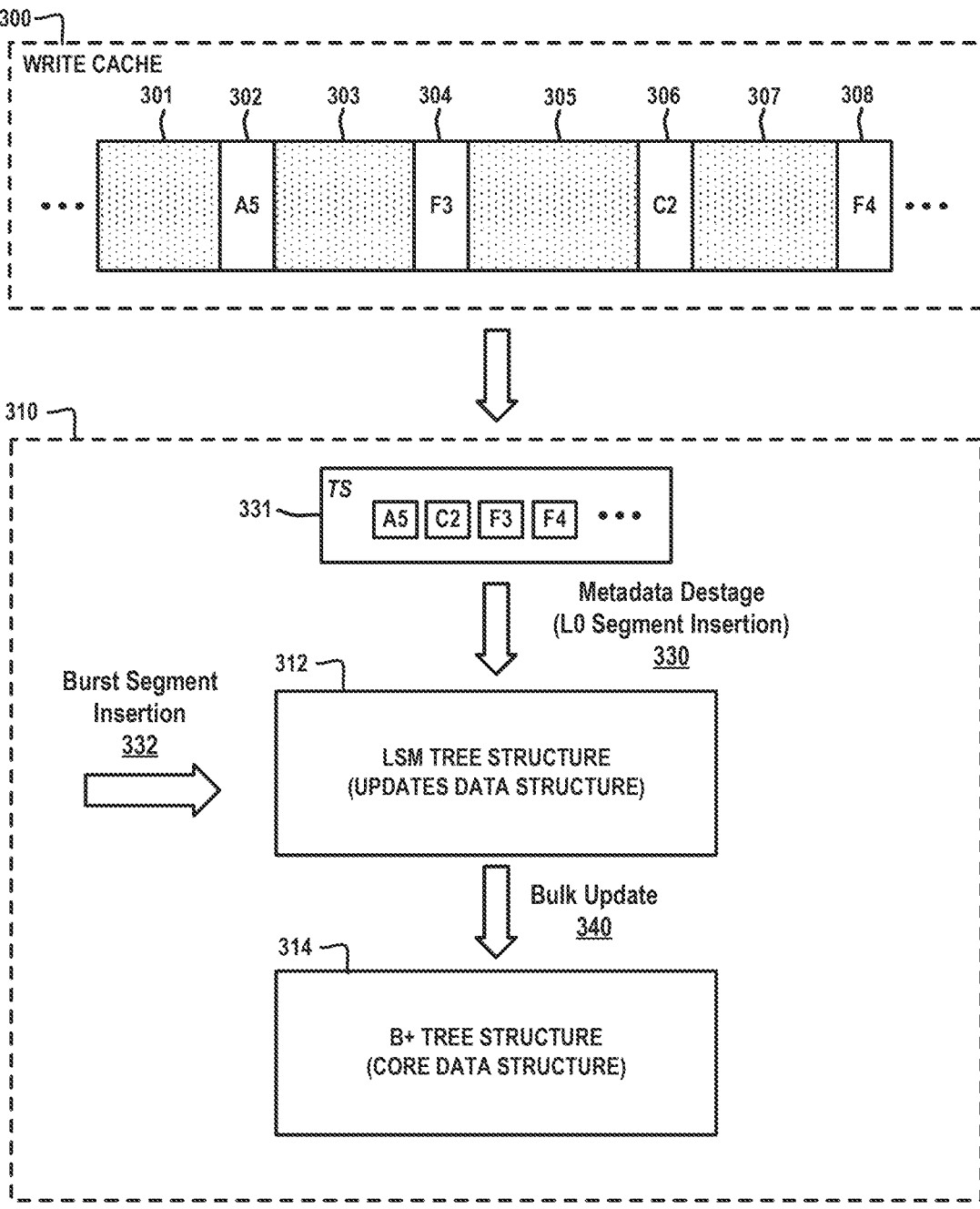
FIG. 3 schematically illustrates a process for utilizing multiple data structures including an LSM tree structure for managing metadata in a storage system, according to an exemplary embodiment of the disclosure.

For example, FIG. 3 schematically illustrates a process for utilizing multiple data structures including an LSM tree structure for managing metadata in a storage system, according to an exemplary embodiment of the disclosure. More specifically, FIG. 3 schematically illustrates a write cache 300, and a primary metadata structure 310 (e.g., storage metadata structure). In some embodiments, the primary metadata structure 310 comprises an LSM tree structure 312 and a B+ tree structure 314. As noted above, the write cache 300 is configured to initially persist data items (e.g., write data of I/O write requests) and metadata items to thereby serve I/O write requests with a minimal delay, and allow the storage control system 210 to return an acknowledgment to a host system when the write data of an I/O write request and associated metadata is successfully written to the write cache 300.

As schematically shown in FIG. 3, the write cache 300 comprises a plurality of data items 301, 303, 305, and 307, and a plurality of associated metadata items 302, 304, 306, and 308. In the illustrative embodiment of FIG. 3, each metadata item 302, 304, 306, and 308 is labeled by a letter and a number. For instance, the metadata item 302 is labeled A5, the metadata item 304 is labeled F3, the metadata item 306 is labeled C2, and the metadata item 308 is labeled F4. The letter of a given metadata item is utilized as a key, which represents a location of the data item (e.g., an offset in a file or volume, or an object ID) associated with the given metadata item, and the number represents a consecutive order of update of the data item (e.g., A5 denotes a next change to A4 for location "A"). In other words, the number represents a generation (or revision) number of the given data item. In an exemplary embodiment in which allocation units (i.e., fixed-size addressable units) of the storage devices have a fixed "allocation unit size" of, e.g., 8 kB, and the letters are keys that represent logical offset locations in a given volume, then the following representations may apply: A→offset 0, B→offset 8 kB, C→offset 16 kB, D→offset 24 kB, E→offset 32 kB, etc.

Since writes to the write cache 300 are acknowledged to the host, the write cache 300 is configured to serve read requests for the cached data items that have not yet been destaged to the primary storage. In some embodiments, the primary metadata structure 310 can be utilized to search and access data items in the write cache 300 before the data items are destaged and stored to primary storage (e.g., HDD/SSD primary storage devices of the storage system), as well as to access data items after they are destaged from the write cache 300 and stored to primary storage.

The LSM tree structure 312 (updates data structure) is configured to accumulate changes/updates to metadata and provide write amortization to the B+ tree structure 314. As shown in FIG. 3, the metadata items in the write cache 300 are added to the LSM tree structure 312 by performing a metadata destage operation 330 under control of the write cache destage control module 232. The metadata destage operation 330 involves writing copies of the metadata items in the write cache 300 to an in-memory buffer in RAM, which is allocated to the LSM tree management module 242 for temporarily buffering cached metadata items before persisting the metadata items in a segment of the LSM tree structure 312. When the in-memory buffer becomes full (e.g., the number or amount of metadata items in the buffer reaches a predetermined buffer size), an immutable segment is created in which the metadata items are added and then inserted into the root level L0 of the LSM tree structure 312. During the metadata destage operation 330, resiliency of the metadata items is provided by the write cache 300 until the buffered metadata items are persisted in the LSM tree structure 312. Once the metadata items are persisted in the LSM tree structure 312, the cached metadata items are no longer needed, and can be removed from the write cache 300.

As schematically shown in FIG. 3, the data and associated metadata items in the write cache 300 are arranged in a temporal order based on, e.g., an order in which user writes are received by the storage control system. In other words, assuming that the letters (e.g., A, F, C, F, etc.) of the data items and associated metadata items represent a logical offset location in volume, the items in the write cache 300 are not arranged in "alphabetic order" but instead are arranged in temporal order. However, when the metadata items are destaged from the write cache 300 and persisted in a given segment in the LSM tree structure 312, the metadata items are arranged in the given segment in a sorted manner (e.g., alphabetical order) to facilitate indexing and searching of the metadata items. For example, as shown in FIG. 3, the metadata items A5, C2, F3, F4, etc., which are destaged from the write cache 300 are included in an immutable segment 331 with a given timestamp (generally denoted TS) that represents a time of creation of the immutable segment. The metadata items A5, C2, F3, F4, etc., a sorted/arranged by key value (alphabetical order), and by order of revision number.

Moreover, FIG. 3 schematically illustrates a burst segment insertion process 332 in which burst segments can be added to non-root levels of the LSM tree structure 312 using techniques discussed below in conjunction with FIGS. 5 and 6. The burst segments comprises data records (e.g., metadata items) that are generated by one or more background processes. The burst segments are much larger in size as compared to the size of the L0 segments that are generated using, e.g., metadata items in the write cache 300, and inserted into the root level L0 of the LSM tree structure 312. In this regard, the burst segments are inserted into non-root levels of the LSM tree structure 312, which have much larger segment sizes (as compared to the L0 segments). This process is based at least in part on the fact that the data records generated by a given background process are not "time sensitive" such that introduction of such data records in the LSM tree structure 312 can be delayed. When a given burst segment is created (scaled and immutable), the burst segment is assigned a timestamp, and is inserted into a non-root level of the LSM tree structure 312.

To enable lookup using the LSM tree structure 312, the internal ordering of the LSM tree structure 312 is the same as the internal ordering of the B+ tree structure 314 in that both tree structures 312 and 314 utilize the same key (e.g., the keys (letters) which represent the offset positions in a given volume). The B+ tree structure 314 is a metadata storage and indexing structure, which is configured to contain all the metadata except the most recent metadata that is contained in the LSM tree structure 312. The B+ tree structure 314 is essentially a semi-static data structure since all metadata updates are first accumulated in the LSM tree structure 312, and then eventually persisted to the B+ tree structure 314 using a bulk update operation 340, as schematically shown in FIG. 3.

It is to be noted the structure and management of B+ tree structures is well-known to those of ordinary skill in the art, the details of which are not necessary for understanding embodiments of the disclosure. In general, the B+ tree structure 314 comprises multiple levels of nodes including a root level comprising a root node, one or more internal node levels, and a leaf node level in which all leaf nodes are in the same level of the B+ tree structure. In the context of exemplary embodiments discussed herein, at any given point in time, the B+ tree structure 314 is configured to enable random access to stored data items in logical offset locations identified by the same metadata keys (e.g., A, B, C, D, E, . . . ) used in the LSM tree structure 312. In particular, in some embodiments, each non-leaf node includes one or more keys (e.g., offset locations), and each leaf node includes one or more key: value pair, wherein each key: value pair comprises a key (represented by a letter) whose value represents, e.g., a logical offset location of the data in volume, and a value "loc" which identifies (e.g., pointer) a physical location of the data in the physical storage space.

The LSM tree structure 312 essentially serves as a journal which persists and accumulates most recent changes of the metadata items, and then over time, the metadata is sorted into the B+ tree structure 314. The bulk update operation 340 is occasionally performed to apply metadata updates from the LSM tree structure 312 to the B+ tree structure 314. The occasional bulk update operation 340 leads to large-scale changes to the B+ tree structure 314, which allows for many optimizations including, but not limited to, write amortization, tree balancing, removal of deleted items, constructing new inner nodes of the B+ tree structure 314 when write-in-place is avoided.

Figure 4:
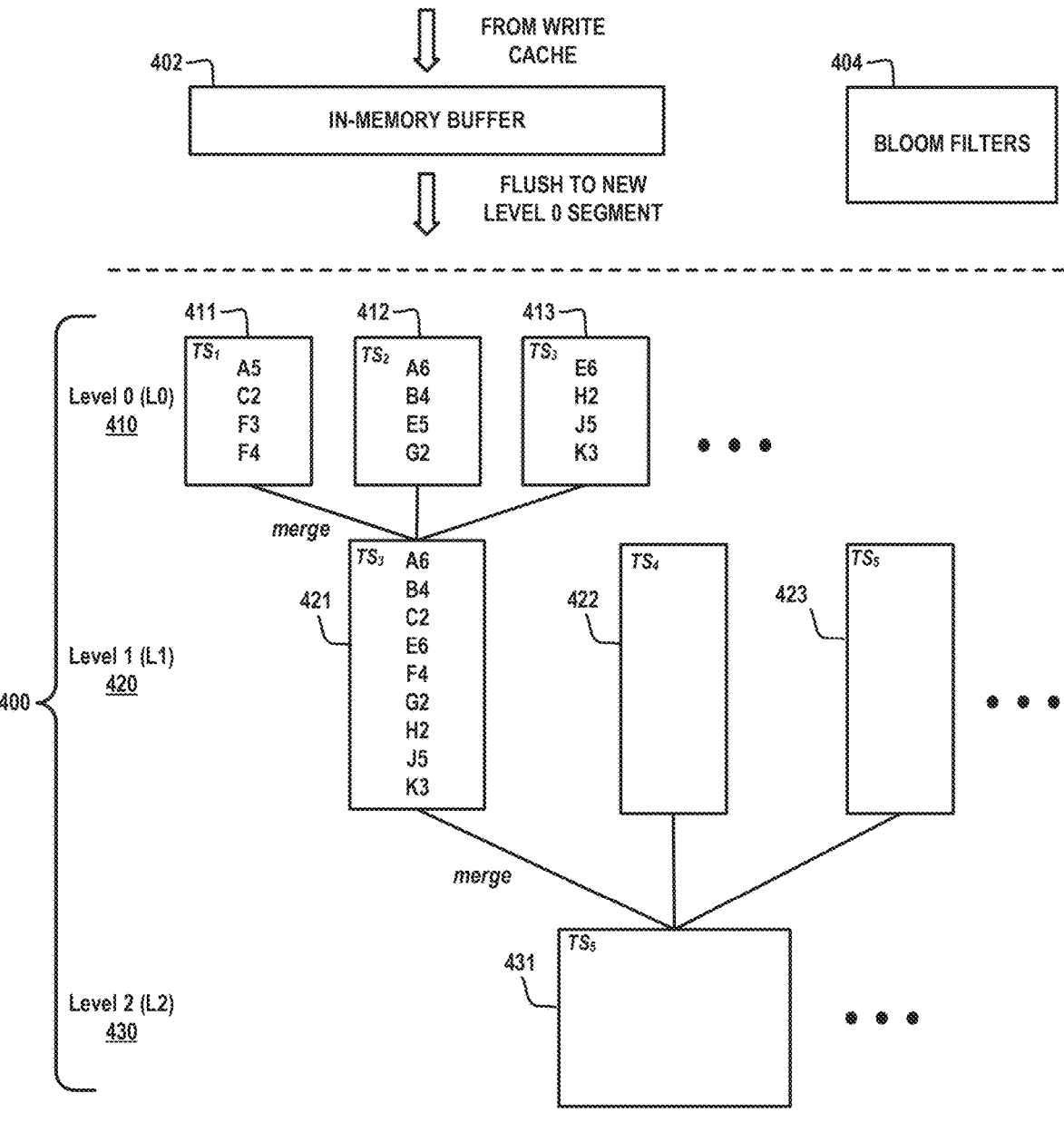
FIG. 4 schematically illustrates an exemplary LSM tree structure which is configured to enable bulk insertion of data, according to an exemplary embodiment of the disclosure.

FIG. 4 schematically illustrates an exemplary LSM tree structure which is configured to enable bulk insertion of data, according to an exemplary embodiment of the disclosure. In some embodiments, FIG. 4 schematically illustrates an exemplary LSM tree structure 400 which can be utilized to implement a primary metadata structure for managing metadata in a storage system, as discussed above. The exemplary LSM tree structure 400 implements an in-memory buffer 402 to support data insertion into the LSM tree structure 400, and Bloom filters 404 to enable search operations for data in the LSM tree structure 400. The LSM tree structure 400 comprises a plurality of levels, e.g., Level 0 (L0), Level 1 (L1), and Level 2 (L2), etc., wherein L0 is deemed the root level of the LSM tree structure 400, and wherein lower levels such as L1, L2, etc., are referred to herein as "non-root" levels. The LSM tree structure 400 is configured to accumulate updates/changes to metadata items (e.g., adding new metadata items, updating metadata items, and deleting metadata items) for a given application, e.g., I/O metadata for data storage applications.

In some embodiments, the in-memory buffer 402 comprises an in-memory structure that is configured to buffer metadata items that are to be inserted into the root level (L0) of the LSM tree structure 400. As noted above, for a data storage application, the in-memory buffer 402 is configured to buffer metadata items that are destaged from a write cache, wherein metadata items in the write cache are destaged by copying the metadata items to the in-memory buffer 402. In some embodiments, the metadata items are inserted into the in-memory buffer 402 and sorted in order (e.g., by offset location (key), and generation number). When the in-memory buffer 402 reaches a predefined threshold size (e.g., allocation unit size, page size, etc.), the accumulated metadata items within the in-memory buffer 402 are flushed to a L0 segment of the LSM tree structure 400. In other words, as noted above, the root level (Level 0) of the LSM tree structure 400 is configured as the point of insertion of new segments of data records into the LSM tree structure 400 under normal operation thereof.

For example, as shown in FIG. 4, the LSM tree structure 400 comprises a plurality of L0 segments 410 (or root level segments) comprising a first segment 411, a second segment 412, a third segment 413, etc. Each L0 segment 410 comprises a persistent immutable data structure which stores a plurality of metadata items that are flushed from the in-memory buffer 402 at a given time. The process of updating the LSM tree structure 400 (under normal operation) prevents a high rate of updates to Level 0 of the LSM tree structure 400 by accumulating metadata changes (e.g., hundreds) in the write cache before the metadata items are written persistently from the in-memory buffer 402 to new L0 segment at once. Once the metadata items are persistently stored in a L0 segment 410, the metadata items in the write cache can be deleted. In the event of a crash while metadata items are still in the in-memory buffer 402, the write cache can be used to recover on the next restart.

More specifically, for purposes of illustration, FIG. 4 shows that first segment 411 comprises sorted metadata items (A5, C2, F3, F4), the second segment 412 comprises sorted metadata items (A6, B4, E5, G2), and the third segment 413 comprises sorted metadata items (E6, H2, J5, K3), wherein the metadata items are sorted by, e.g., keys (offset locations represented by letters in alphabetic order) and generation number. For example, the first segment 411 comprises metadata items F3 and F4 where F4 denotes a recent change to data at offset location F from the previous version F3. In addition, the first and second segments 411 and 412 include respective metadata items A5 and A6, where A6 denotes a recent change to data at offset location A from the previous version A5. Further, the second and third segments 412 and 413 include respective metadata items E5 and E6, where E6 denotes a recent change to data at offset location E from the previous version E5. Within a given segment, the ordering of the metadata items is maintained based on the index key, while different segments in a given level may contain overlapping keys. For example, for the L0 segments 410 shown in FIG. 4, the first segment 411 includes metadata item A5, and the second segment 412 includes metadata item A6.

In this regard, FIG. 4 illustrates an exemplary embodiment in which updated metadata items are written out-of-place by appending an update to the same or a new L0 segment, as metadata items in the write cache are added to the LSM tree structure 400. The older values of metadata items can be removed at a later point in time through merge-sort operations (or compaction operations). While FIG. 4 shows each of the segments 411, 412, and 413 having four (4) metadata items for case of illustration, each L0 segment 410 can have hundreds of metadata items. For example, the L0 segments 410 can each have a size of, e.g., 8 KB, 16 KB, or 32 KB, etc., which corresponds to an allocation unit size, or page size, etc.

During normal operation and use of the LSM tree structure 400, the L0 segments 410 are continuously generated as more blocks of metadata items are flushed from the in-memory buffer 402 and stored in new segments in the L0 level of the LSM tree structure 400. Periodically, multiple segments in a given level L(i) (e.g., L0) of the LSM tree structure 400 are merged together into a single segment that is added to the next level L(i+1) (e.g., L1). The merging is performed using, e.g., merge-sort algorithms, to reduce the number of segments that need to be searched.

For example, as shown in FIG. 4, the LSM tree structure 400 comprises a plurality of L1 segments 420 including a first segment 421, a second segment 422, a third segment 423, etc., and a plurality of L2 segments 430 including a first segment 431, etc. In the exemplary embodiment shown in FIG. 4, the segments 411, 412, and 413 in L0 are merged together into the first segment 421 in L1 of the LSM tree structure 400. The first segment 421 in L1 aggregates the metadata items from each of the L0 segments 411, 412, and 413, and stores the metadata items in a sorted order. Following the merge operation, the L0 segments 411, 412, and 413 (source segments) are removed from the LSM tree structure 400. While not specifically shown in FIG. 4, the second and third segments 422 and 423 in L1 of the LSM tree structure 400 could each have a plurality of sorted entries aggregated from merging different blocks of three segments in L0 of the LSM tree structure 400. Moreover, the first segment 431 in L2 of the LSM tree structure 400 could have a plurality of sorted records as a result of merging the segments 421, 422, and 423 in L2 of the LSM tree structure 400.

It is to be understood that the number of segments that are merged together (i.e., number of segments in a merge set) is implementation specific, and that FIG. 4 illustrates an exemplary, non-limiting embodiment in which each merge set is shown to include 3 segments for case of illustration. The segments in a given level are merged to a lower level with a property that a segment in a lower level is an order of magnitude bigger than the previous level. For example, in some embodiments, each L0 segment 410 in the root level can have a size that is equivalent to a page size (e.g., 8 KB, 16 KB, 32 KB, etc.), while segments of lower levels, e.g., L1 and L2, etc., will be increasingly larger in size and have multiple pages. For example, in some embodiments, the size of each of the L1 segments 420 can be on the order of hundreds of megabytes (MB), while the size of each of the L2 segments 430 can be on the order of tens of gigabytes (GB).

As part of the segment merge operations, a process is implemented to resolve multiple occurrences of the same key that are present in a new segment to thereby produce at most a single record for a given key within the new segment. For example, in some embodiments, older versions of metadata entries will be deleted when they are merged with newer versions of metadata entries having the same key value. In other embodiments, older versions of metadata entries will be combined with newer versions of metadata entries having the same key value. In other embodiments, a given metadata item is removed by creating a "delete" record that negates the given metadata item. For deduplication applications, metadata items can include reference-counting items wherein "increment-reference" records and "decrement-reference" records can be included which modify a given reference count. In some embodiments, a process of resolving multiple occurrences of the same key that are presented in a new segment rely on an ordering between segments wherein the ordering is (i) implied by the sequence of segments (from left to right) for conventional LSM implementation, or (ii) explicit based on timestamps applied to the segments, as explained in further detail below.

Furthermore, when segments are merged, a new Bloom filter is created for the new segment, wherein the size of the new Bloom filter is proportional to the size of the new segment. In some embodiments, each segment in the LSM tree structure 400 is stored as a file, wherein the metadata items in a given segment are divided into fixed size pages (e.g., 8 kB blocks) of the file. More specifically, in some embodiments, each segment in each level of the LSM tree structure 400 is divided into one or more pages which facilitates access, memory allocation, persistency, and swapping segments or portions of segments in and out of memory. The pages are used for purposes of memory allocation and to facilitate lookup for a target metadata item in the LSM tree structure 400. For example, each segment can have additional metadata with regard to the page(s) of the segment, wherein such metadata comprises a page key for each page in the segment, and an associated value which represents the key (e.g., offset location) of the first metadata item within the given segment. To locate a given entry in a given segment, the segment may include a page index which records a key of the first entry in each page. The page index together with the Bloom filters 404 provide for fast searching of metadata items in the LSM tree structure 400 using techniques known to those of ordinary skill in the art.

In particular, when searching for a given metadata item which may be located in a given segment of the LSM tree structure 400, the Bloom filters 404 will be used initially to enable efficient per-segment lookup. A Bloom filter for a given segment provides an indication that (i) the given segment may contain a key that is being searched for with a high probability, or that (ii) the given segment does not include the key that is being searched. In some embodiments, if a given segment is identified (via Bloom filtering) to likely have the target key, a binary search can be conducted to find and access the key within the given segment (if the key does in fact exist in the given segment). In some embodiments, for large sized segments, once a given segment is identified (via Bloom filtering) to most likely contain the target key, the page index for the given segment can be used to identify the page within the given segment which would have the key (if the key was indeed in the segment). Once the target page in the given segment is identified via the page index, the page can be loaded to memory and to perform a binary search of the keys in the target page to find the target key. In this regard, the first key of each page is maintained in RAM to reduce the search within a segment to a single page utilizing the fact that the segments are sorted.

In a conventional implementation of an LSM tree structure, the segments in a given level of the LSM tree structure have a sequential order which is based on their time of creation, and hence between segments, there is weak ordering on the "freshness" or "time" of the data stored in each segment. For example, in FIG. 4, the L0 segments 411, 412, and 413 can have an implied time of creation based on the sequential order from left to right, where the second segment 412 is deemed to be created after the first segment 411, and the third segment 413 is deemed to be created after the second segment 412, etc. However, such implied time of creation based on sequential ordering is not sufficient in exemplary embodiments such as described herein where burst segments can be added to non-root levels (e.g., L1, L2, etc.) of the LSM tree structure 400, wherein the burst segments include data records, metadata items, etc., which are generated by a background process.

Indeed, the exemplary burst segment insertion techniques as described herein are based on the fact that the data records provided by a background process are not "time sensitive," such that the insertion of such background-generated data records into the LSM tree structure 400 can be delayed (as the background worker itself could be delayed). In particular, the insertion of such data records into the LSM tree structure 400 can be delayed as the data records (generated by the background process) remain in "staging" where the data records are sorted and added to burst segments that are generated in the background and persisted while awaiting insertion into a non-root level of the LSM tree structure 400. In this regard, a burst segment can have a creation time which is less than the creation time of a newest segment in a given non-root level of the LSM tree structure 400.

In this regard, to enable insertion of burst segments into non-root levels of the LSM tree structure 400, each segment of the LSM tree structure 400 is augmented with a timestamp which explicitly quantifies a freshness of objects within the given segment, and which allows for comparing timestamp values between segments to determine the relative freshness of object within the segments being compared (which, as noted above, is in contrast to conventional implementation where "freshness" is implied by segment ordering in a given level of the LSM tree structure). For example, as shown in FIG. 4, in the root level L0 the LSM tree structure 400, the first, second, and third segments 411, 412, and 413 have respective timestamps $TS_1$, $TS_2$, and $TS_3$ (or generally, time attributes) with time values such that $TS_3 > TS_2 > TS_1$. In the root level L0, the timestamp for a given segment represents the time when the given segment was "sealed" either due to flushing the segment to persistent storage, or for some other reason the given segment is no longer accepting metadata items.

On the other hand, during a merge operation wherein a set of segments (merge set) are merged into a new segment in a lower (non-root) level, the new segment is assigned the timestamp of the most recent segment within the merge set. For example, as shown in FIG. 4, when the first, second, and third segments 411, 412, and 413 (merge set) in the root level L0 are merged into the first segment 421 in L1, the first segment 421 is assigned the timestamp $TS_3$ which corresponds to the timestamp of the third segment 413 in L0, which is determined to be the newest segment in the merge set given that $TS_3 > TS_2 > TS_1$. As further shown in FIG. 4, the second and third segments 422 and 423 in L1 have respective timestamps $TS_4$ and $TS_5$. Assuming that that second and third segments 422 and 423 are not burst segments that have been added to L1 (but rather are segments that are generated by merging groups of L0 segments), the respective timestamps $TS_3$, $TS_4$, and $TS_5$ of the segments 421, 422, and 423 in L1 have time values such that $TS_5 > TS_4 > TS_3$. As further shown in FIG. 4, when the first, second, and third segments 421, 422, and 423 (merge set) in L1 are merged into the first segment 431 in L2, the first segment 431 is assigned the timestamp $TS_5$ which corresponds to the timestamp of the third segment 423 in L1, which is determined to be the newest segment in the merge set given that $TS_5 > TS_4 > TS_3$.

As noted above, data records that are generated by a background process are records that are not "time sensitive" such that insertion of burst segments (having such background-generated data records) into the LSM tree structure can be delayed in time. A given burst segment is generated by aggregating a plurality of background-generated data records into a given segment, and then assigning a timestamp to the given segment which represents a time when the given burst segment is scaled and immutable. The given burst segment is then added to a non-root level of the LSM tree structure at an appropriate time, where the data records of the given burst segment become visible to queries and the given burst segment can be included in a merge set to generate a new segment in a lower level of the LSM tree structure.

Figure 5:
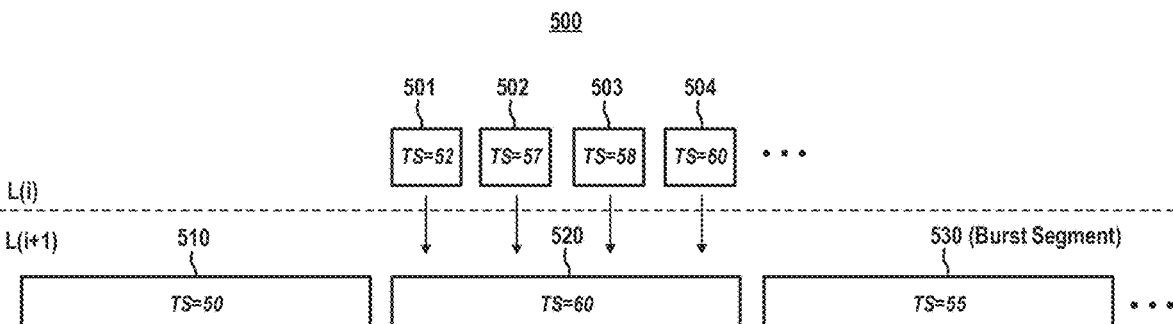
FIG. 5 schematically illustrates a method for bulk insertion of data into an LSM tree structure, according to an exemplary embodiment of the disclosure.

For example, FIG. 5 schematically illustrates a method for bulk insertion of data into an LSM tree structure, according to an exemplary embodiment of the disclosure. In in particular FIG. 5 schematically illustrates an LSM tree structure 500 comprising two levels L(i) and L(i+1), wherein the level L(i) comprises a plurality of segments 501, 502, 503, and 504, and the level L(i+1) comprises a plurality of segments 510, 520, and 530. In an exemplary embodiment, the level L(i) can be a root level (i=0) or non-root level (i=1, 2, etc.), and the level L(i+1) is a non-root level. The segments 501, 502, 503, and 504 in level L(i) have timestamps TS with respective values of 52, 57, 58, and 60. The segments 510, 520, and 530 in the non-root level L(i+1) have timestamps TS with respective values of 50, 60, and 55. The segment 530 is a burst segment that is inserted directly into the non-root level L(i+1).

For illustrative purposes, FIG. 5 schematically illustrates a merge process in which the segments 501, 502, 503, and

504 in level L(i) comprise a merge set which are aggregated (via a merge-sort process) to form the segment 520 which is added to the non-root level L(i+1). As noted above, during a merge operation where multiple segments (merge set) are merged into a new segment in a lower level, the new segment is assigned the timestamp of the most recent segment within the merge set. In this regard, the segment 520 is assigned the timestamp TS=60 which corresponds to the timestamp of the segment 504 in the level L(i), which is determined to be the newest segment in the merge set given that TS=60 is greater than the timestamp values of the other segments 501, 502, and 503 in the merge set.

Moreover, FIG. 5 schematically illustrates a burst segment insertion process in which the burst segment 530 with timestamp TS=55 is inserted in the non-root level L(i+1) at the proper time, e.g., following the addition of the new segment 520 with TS=60. In the exemplary embodiment of FIG. 5, it is assumed that the burst segment 530 comprises a plurality of data records (e.g., metadata items) generated by some background process and aggregated into a burst segment that was scaled (immutable) at a time corresponding to the timestamp TS=55. Even though the burst segment 530 with an earlier timestamp TS=55 is inserted in the non-root level L (i+1) after the segment 520 with a later timestamp TS=60 (resulting in segments 510, 520, and 530 in the non-root level L(i+1) with timestamps that are out of order), the burst segment 530 (TS=55) should not be inserted in the non-root level L(i+1) before the segment 520 (TS=60) because the segment 520 was generated as a result of merging a set of segments which includes at least one segment with a timestamp that is less than the timestamp (TS=55) of the burst segment 530. More specifically, in the exemplary embodiment of FIG. 5, the segment 520 is generated by including the data records of the segment 501 with a timestamp TS=52, which is less than the timestamp TS=55 of the burst segment 530.

In this regard, the bulk data insertion process is configured to ensure that a given burst segment (e.g., burst segment 530) is not inserted into a given non-root level of an LSM tree structure before any segment in the given non-root level which (i) has a timestamp that is less than the timestamp of the given burst segment, and which (ii) includes a set of merged segments that that includes at least one segment (in the merge set) with a timestamp that is less than the timestamp of the given burst segment. For example, in the exemplary embodiment of FIG. 5, the burst segment 530 (TS=55) cannot be inserted before the segment 510 (TS=50) since the segment 510 has a timestamp (TS=50) which is less than the timestamp (TS=55) of the burst segment 530. In addition, the burst segment 530 (TS=55) cannot be inserted before the segment 520 (TS=60) since the segment 520 is generated by merging a set of segments 501, 502, 503, and 504, wherein at least the segment 501 has a timestamp (TS=52) which is less than the timestamp (TS=55) of the burst segment 530. The bulk insertion process is configured to ensure that proper relationships between data records with the same key are respected, as the data records are merged between different segments. For example, for create-delete pair of data records, the insertion of segments such as burst segments into the LSM tree structure is performed in a manner so that a delete record does not come before the "create" record.

Figure 6:
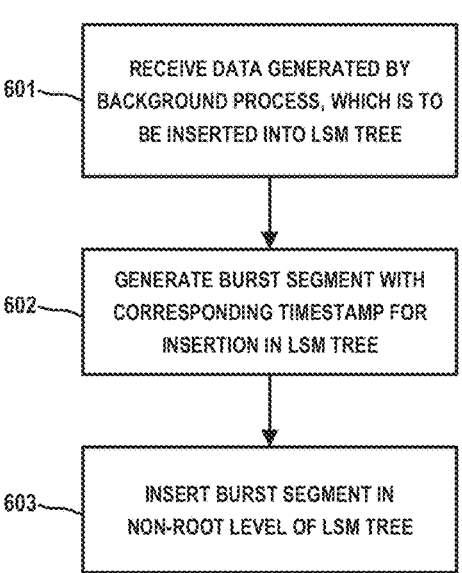
FIG. 6 illustrates a flow diagram of a method for bulk insertion of data into an LSM tree structure, according to an exemplary embodiment of the disclosure.

FIG. 6 illustrates a flow diagram of a method 600 for bulk insertion of data into an LSM tree structure, according to an exemplary embodiment of the disclosure. For purposes of illustration, FIG. 6 will be discussed in the context of the exemplary LSM tree structure 500 of FIG. 5, and the exemplary metadata management system 240 of FIG. 2. The method 600 comprises receiving data that is generated by a background process, which data is to be inserted into an LSM tree structure (block 601). For example, in the context of data storage system, the background process can be a data deduplication process, a data replication process, etc. The received data is aggreged to generate a burst segment with a corresponding timestamp, which is to be inserted into a non-root level of the LSM tree structure (block 602). For example, in the exemplary metadata management system 240 of FIG. 2, the burst data management module 248 is configured to receive bulk data that is generated by the background process, and aggregate the bulk data into one or more burst segments. A given burst segment is accorded a timestamp by operation of the timestamp generator module 246, when the given burst segment is scaled or is deemed immutable.

The given burst segment is then inserted in a non-root level of the LSM tree structure (block 603). For example, in some embodiments, the LSM tree management module 242 in FIG. 2 is configured to control and manage the insertion of new segments into the root level (L0) and control merge-sort operations to merge a set of segments in a given level to thereby create a new segment with a given timestamp that is inserted into a next lower level of the LSM tree structure, using methods as discussed above in conjunction with, e.g., FIG. 4, as well as insert burst segments into non-root levels of the LSM tree structure using methods as discussed above in conjunction with FIG. 5.

It is to be appreciated that the exemplary bulk data insertion techniques as discussed herein are designed to enhance the robustness of an LSM tree structure by allowing the LSM tree structure to have a large burst of data record insertions efficiently, given that the insertion of such data records is delayable. Such techniques allow the LSM tree structure to retain roughly the same performance for the main stream of insertions, while being able to sustain a sudden burst of available data. The ability to correctly insert burst segments with data items into non-root levels of the LSM tree structure and maintain correctness provide significant performance advantages over conventional LSM tree structure implementations in which segments of data records are only inserted into the root level of the LSM tree structure. Moreover, by allowing one or more levels of the LSM tree structure to be bypassed for such bulk insertion, write-amplification is reduced, enhancing the endurance of the underlying storage media.

Figure 7:
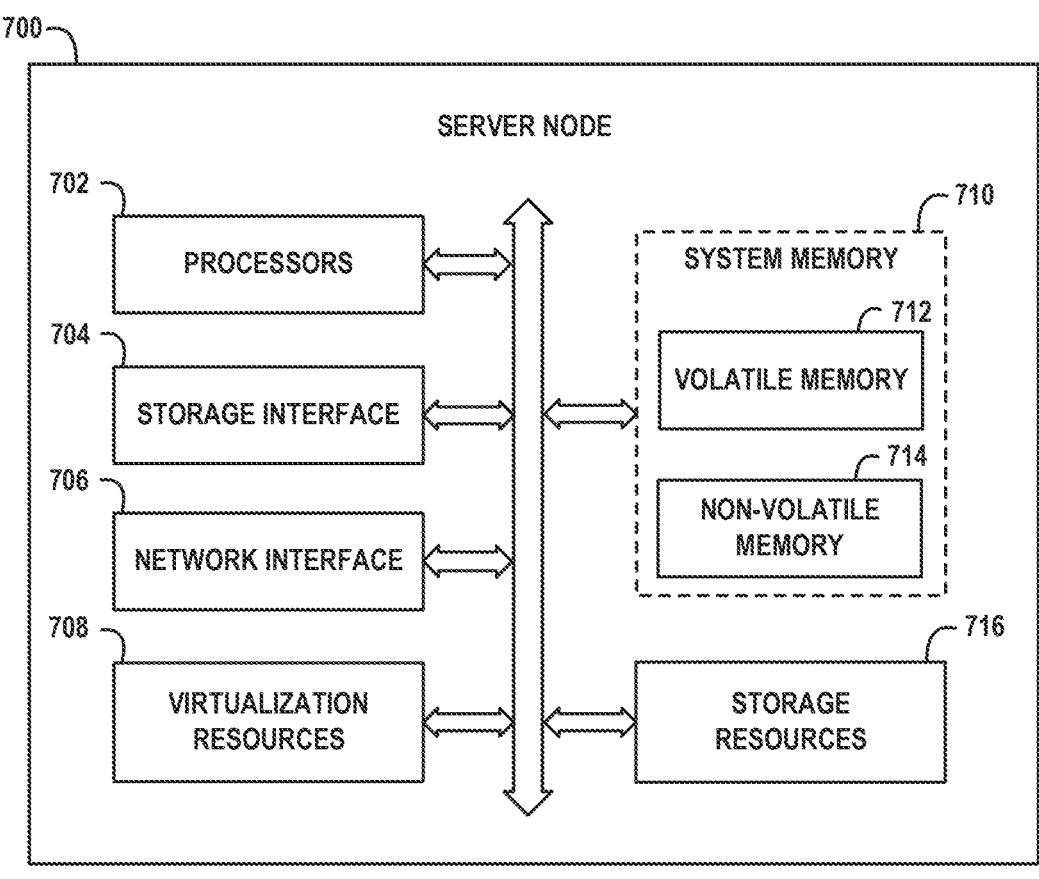
FIG. 7 schematically illustrates a framework of a server node for hosting a storage node, according to an exemplary embodiment of the disclosure.

FIG. 7 schematically illustrates a framework of a server node for hosting a storage node, according to an exemplary embodiment of the disclosure. For example, FIG. 7 schematically illustrates a framework of a server node 700 for hosting the exemplary storage node 200 of FIG. 2, according to an exemplary embodiment of the disclosure. The server node 700 comprises processors 702, storage interface circuitry 704, network interface circuitry 706, virtualization resources 708, system memory 710, and storage resources 716. The system memory 710 comprises volatile memory 712 and non-volatile memory 714. The processors 702 comprise one or more types of hardware processors that are configured to process program instructions and data to execute a native operating system (OS) and applications that run on the server node 700.

For example, the processors 702 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of work-load-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 704 enables the processors 702 to interface and communicate with the system memory 710, the storage resources 716, and other local storage and off-infrastructure storage media, using one or more standard communication and/or storage control protocols to read data from or write data to volatile and non-volatile memory/ storage devices. Such protocols include, but are not limited to, NVMe, PCIe, PATA, SATA, SAS, Fibre Channel, etc. The network interface circuitry 706 enables the server node 700 to interface and communicate with a network and other system components. The network interface circuitry 706 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 708 can be instantiated to execute one or more services or functions which are hosted by the server node 700. For example, the virtualization resources 708 can be configured to implement the various modules and functionalities of a storage control system and metadata management system as discussed herein. In some embodiments, the virtualization resources 708 comprise virtual machines that are implemented using a hypervisor platform which executes on the server node 700, wherein one or more virtual machines can be instantiated to execute functions of the server node 700. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 700, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host system. The underlying physical infrastructure may comprise one or more commercially available distributed processing platforms which are suitable for the target application.

In another embodiment, the virtualization resources 708 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 700 as well as to execute one or more of the various modules and functionalities of a storage control system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent components and modules of the storage nodes and storage control systems as discussed herein, as well as the metadata management methods as discussed herein, are implemented using program code that is loaded into the system memory 710 (e.g., volatile memory 712), and executed by the processors 702 to perform respective functions as described herein. In this regard, the system memory 710, the storage resources 716, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 710 comprises various types of memory such as volatile RAM, NVRAM, or other types of memory, in any combination. The volatile memory 712 may be a dynamic random-access memory (DRAM) (e.g., DRAM DIMM (Dual In-line Memory Module), or other forms of volatile RAM. The non-volatile memory 714 may comprise one or more of NAND Flash storage devices, SSD devices, or other types of next generation non-volatile memory (NGNVM) devices. The system memory 710 can be implemented using a hierarchical memory tier structure wherein the volatile memory 712 is configured as the highest-level memory tier, and the non-volatile memory 714 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 702 to execute a native operating system and one or more applications or processes hosted by the server node 700, and to temporarily store data that is utilized and/or generated by the native OS and application programs and processes running on the server node 700. The storage resources 716 can include one or more HDDs, SSD storage devices, etc.

It is to be noted that the exemplary techniques as disclosed herein for managing LSM tree structures and enabling bulk insertion of data into LSM tree structures can be used in various applications in which metadata or data records are managed using an LSM tree structure. For example, storage systems utilize some form of internal layout for a physical data layer, and employ a mapping mechanism from a logical layer (as understood by user volumes or files) to a physical layer that is used to store data. A storage controller may arrange data in the physical layer using various methods such as, e.g., packing data to conserve capacity, implementing a log-structured array, storage tiering, etc. In addition, storage systems require various types of metadata to support core storage functionality. Such metadata includes, e.g., metadata for mapping logical locations (offset in a file or volume) to a physical location (to track the physical location of stored data items), invalidation and garbage collection related metadata, metadata for accounting, deduplication referencing, snapshot generation, and tracking relationships, and resiliency related metadata (e.g., RAID), etc.

In this regard, the exemplary LSM tree structures and techniques for managing metadata using LSM tree structures as disclosed herein can be used to manage and search for metadata providing virtual-to-logical mapping functionality, or logical-to-physical mapping functionality, for data storage applications. In other embodiments the primary metadata structures with LSM tree structured can be implemented to manage metadata associated with a fingerprints lookup database for deduplication. Such a database is used to compare a fingerprint (e.g., hash) of new data being written to the storage system with the fingerprints of existing data in the storage system which are included in the lookup database. New data that is not deduplicated will have its fingerprints added to the database. Typically, the size of the deduplication database is too large to fit in RAM. However, using a primary metadata structure as disclosed herein, the lookup in the database can be performed lazily for pages not currently in RAM. The new fingerprints are added to the updates data structure, and as they propagate down the LSM tree structure, the detection of identical fingerprints is an indication of potential deduplication that can now take place.

In this regard, it is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:

utilizing, by a data management system, a log-structured merge (LSM) tree structure as a metadata structure to manage metadata records used for searching and locating stored data in a storage system, wherein utilizing the LSM tree structure comprises:

inserting, by the data management system, new segments of metadata records generated in response to user input/output (I/O) requests, into a root level of the LSM tree structure;

receiving, by the data management system, a plurality of metadata records generated at least in part by at least one background process that is performed with regard to at least a portion of the stored data in the storage system;

generating, by the data management system, a burst segment which comprises at least a portion of the plurality of metadata records generated at least in part by the at least one background process, wherein generating the burst segment comprises assigning a timestamp to the burst segment which corresponds to a time of creation of the burst segment; and inserting, by the data management system, the burst segment into a non-root level of the LSM tree structure at a given time based at least in part on the timestamp of the burst segment and a timestamp of at least one other segment in the non-root level.

2. The method of claim 1, wherein the background process comprises at least one of a deduplication process, a data migration process, and a data replication process.

3. The method of claim 1, wherein inserting the burst segment into the non-root level of the LSM tree structure comprises inserting the burst segment into the non-root level of the LSM tree structure subsequent to an existing segment in the non-root level such that the existing segment has at least one of (i) a timestamp which is less than the timestamp of the burst segment, and (ii) a timestamp which is greater than the timestamp of the burst segment, but which comprises a set of merged segments that includes at least one segment with a timestamp that is less than the timestamp of the burst segment.

4. The method of claim 1, further comprising:

performing a merge operation to aggregate metadata records of a set of segments in the non-root level of the LSM tree structure into a new segment;

assigning a timestamp to the new segment which corresponds to a timestamp of a segment in the set of segments which is deemed to be a newest segment based on the respective timestamps of the segments within the set of segments; and inserting the new segment with the assigned timestamp into a next non-root level of the LSM tree structure.

5. The method of claim 1, wherein:

each new segment of metadata records inserted into the root level comprises a respective timestamp that corresponds to a time of creation of the new segment; and the new segments in the root level are arranged in time order based on the respective timestamps of the new segments.

6. The method of claim 5, wherein each segment inserted into the root level of the LSM tree structure, comprises sorted metadata records which correspond to the user I/O requests and which are destaged from a write cache.

7. The method of claim 5, further comprising:

performing a merge operation to aggregate metadata records of a set of segments in the root level of the LSM tree structure into a new segment;

assigning a timestamp to the new segment which corresponds to a timestamp of a segment in the set of segments which is deemed to be a newest segment based on the respective timestamps of the segments within the set of segments; and inserting the new segment with the assigned timestamp into a next level of the LSM tree structure.

8. An article of manufacture comprising a non-transitory processor-readable storage medium having stored therein program code of one or more software programs, wherein the program code is executable by one or more processors to implement a method which comprises:

utilizing, by a data management system, a log-structured merge (LSM) tree structure as a metadata structure to manage metadata records used for searching and locating stored data in a storage system, wherein utilizing the LSM tree structure comprises:

inserting, by the data management system, new segments of metadata records generated in response to user input/output (I/O) requests, into a root level of the LSM tree structure;

receiving, by the data management system, a plurality of metadata records generated at least in part by at least one background process that is performed with regard to at least a portion of the stored data in the storage system;

generating, by the data management system, a burst segment which comprises at least a portion of the plurality of metadata records generated at least in part by the at least one background process, wherein generating the burst segment comprises assigning a timestamp to the burst segment which corresponds to a time of creation of the burst segment; and inserting, by the data management system, the burst segment into a non-root level of the LSM tree structure at a given time based at least in part on the timestamp of the burst segment and a timestamp of at least one other segment in the non-root level.

9. The article of manufacture of claim 8, wherein the background process comprises at least one of a deduplication process, a data migration process, and a data replication process.

10. The article of manufacture of claim 8, wherein the program code for inserting the burst segment into the non-root level of the LSM tree structure comprises program code for inserting the burst segment into the non-root level of the LSM tree structure subsequent to an existing segment in the non-root level such that the existing segment has at least one of (i) a timestamp which is less than the timestamp of the burst segment, and (ii) a timestamp which is greater than the timestamp of the burst segment, but which comprises a set of merged segments that includes at least one segment with a timestamp that is less than the timestamp of the burst segment.

11. The article of manufacture of claim 8, further comprising program code for:

performing a merge operation to aggregate metadata records of a set of segments in the non-root level of the LSM tree structure into a new segment;

assigning a timestamp to the new segment which corresponds to a timestamp of a segment in the set of segments which is deemed to be a newest segment based on the respective timestamps of the segments within the set of segments; and inserting the new segment with the assigned timestamp into a next non-root level of the LSM tree structure.

12. The article of manufacture of claim 8, wherein:

each new segment of metadata records inserted into the root level comprises a respective timestamp that corresponds to a time of creation of the new segment; and the new segments in the root level are arranged in time order based on the respective timestamps of the new segments.

13. The article of manufacture of claim 12, wherein each segment inserted into the root level of the LSM tree structure, comprises sorted metadata records which correspond to the user I/O requests and which are destaged from a write cache.

14. The article of manufacture of claim 12, further comprising program code for:

performing a merge operation to aggregate metadata records of a set of segments in the root level of the LSM tree structure into a new segment;

assigning a timestamp to the new segment which corresponds to a timestamp of a segment in the set of segments which is deemed to be a newest segment based on the respective timestamps of the segments within the set of segments; and inserting the new segment with the assigned timestamp into a next level of the LSM tree structure.

15. An apparatus comprising:

at least one processor; and memory configured to store program code, wherein the program code is executable by the at least one processor to instantiate a data management system, wherein the data management system is configured to:

utilize a log-structured merge (LSM) tree structure as a metadata structure to manage metadata records used for searching and locating stored data in a storage system, wherein utilizing the LSM tree structure comprises:

insert new segments of metadata records generated in response to user input/output (I/O) requests, into a root level of the LSM tree structure;

receive a plurality of metadata records generated at least in part by at least one background process that is performed with regard to at least a portion of the stored data in the storage system;

generate a burst segment which comprises at least a portion of the plurality of metadata records generated at least in part by the at least one background process, wherein generating the burst segment comprises assigning a timestamp to the burst segment which corresponds to a time of creation of the burst segment; and insert the burst segment into a non-root level of the LSM tree structure at a given time based at least in part on the timestamp of the burst segment and a timestamp of at least one other segment in the non-root level.

16. The apparatus of claim 15, wherein the background process comprises at least one of a deduplication process, a data migration process, and a data replication process.

17. The apparatus of claim 15, wherein in inserting the burst segment into the non-root level of the LSM tree structure, the data management system is configured to insert the burst segment into the non-root level of the LSM tree structure subsequent to an existing segment in the non-root level such that the existing segment has at least one of (i) a timestamp which is less than the timestamp of the burst segment, and (ii) a timestamp which is greater than the timestamp of the burst segment, but which comprises a set of merged segments that includes at least one segment with a timestamp that is less than the timestamp of the burst segment.

18. The apparatus of claim 15, wherein the data management system is further configured to:

perform a merge operation to aggregate metadata records of a set of segments in the non-root level of the LSM tree structure into a new segment;

assign a timestamp to the new segment which corresponds to a timestamp of a segment in the set of segments which is deemed to be a newest segment based on the respective timestamps of the segments within the set of segments; and insert the new segment with the assigned timestamp into a next non-root level of the LSM tree structure.

19. The apparatus of claim 15, wherein:

each new segment of metadata records inserted into the root level comprises a respective timestamp that corresponds to a time of creation of the new segment; and the new segments in the root level are arranged in time order based on the respective timestamps of the new segments.

20. The apparatus of claim 19, wherein the data management system is further configured to:

perform a merge operation to aggregate metadata records of a set of segments in the root level of the LSM tree structure into a new segment;

assign a timestamp to the new segment which corresponds to a timestamp of a segment in the set of segments which is deemed to be a newest segment based on the respective timestamps of the segments within the set of segments; and insert the new segment with the assigned timestamp into a next level of the LSM tree structure.

*    *    *    *    *